Jan. 14, 1969 A. S. SCIPIONE 3,422,223

SYNCHRONIZING GENERATOR FOR A TELEVISION SYSTEM WITH ADJUSTABLE INTERLACE

Filed April 26, 1966

INVENTOR.
ALFRED S. SCIPIONE

BY H. L. Mackey

ATTORNEY

United States Patent Office 3,422,223

Patented Jan. 14, 1969

3,422,223

SYNCHRONIZING GENERATOR FOR A TELEVISION SYSTEM WITH ADJUSTABLE INTERLACE

Alfred S. Scipione, Stamford, Conn., assignor to General Precision Systems Inc., a corporation of Delaware Filed Apr. 26, 1966, Ser. No. 545,418
U.S. Cl. 178—69.5 9 Claims
Int. Cl. H04l 7/00

The present invention relates to television synchronizing generator systems. In particular the present invention relate to a television synchronizing generation system with adjustable interlace which may be easily incorporated into a television camera without presenting the problem of isolating the synchronizing circuitry from highly sensitive amplifiers within the same housing.

Present day television techniques provide conventional interlacing generator providing two pulse wave forms, that is, the horizontal pulse or sync pulse and the vertical pulse or sync pulse. It is normal of the two pulses that every other vertical pulse lie halfway between two horizontal pulses, and that the vertical pulses be separated from each other by half the number of scanning lines composing the television picture.

In a 525 line scan television system with a horizontal frequency of 15,750 cycles per second (Hz.) and a vertical frequency of 60 Hz. the vertical pulses would be separated by 262.5 horizontal pulses. It has been the practice to provide a master oscillator having an output frequency of 31,500 Hz. (31.5 kHz.) and to divide the frequency by 2 for providing the 15,750 Hz. horizontal frequency. However, with this frequency arrangement there is always a pulse from the master oscillator output occurring in the center of the horizontal scan of the television picture, that is timewise, halfway through the horizontal pulse.

If, for example, the sync generator were incorporated within the camera, careful and considerable shielding may be necessary to prevent the highly sensitive amplifiers in the camera from picking up the oscillator pulse occurring during the horizontal pulse period. In the event that such pulse were picked up by the amplifiers this would show up as an interference line in the center of the television picture.

In addition to the undesirable features of generating a base frequency of 31.5 kHz. there is no way of satisfactorily adjusting the amount or position of interlace.

The present invention provides a sync generator with an interlacing system for television systems which may be incorporated within the camera without generating an interference in the television picture and at the same time provides a satisfactory interlace adjustment. In addition the present system provides stability which is equal to or better than present interlace systems, and has the added advantage of having the basic operating frequency equal to the horizontal pulse rate and is particularly adaptable for use in odd-line scan television systems.

Conventional interlace sync generators used in odd-line scan television systems employ a basic frequency which is twice that of the horizontal frequency. The horizontal sync frequency is obtained by dividing the basic frequency by two. The frequency of the vertical sync pulse is such that a pulse is provided in response to a number of horizontal pulses equal to one-half the number of scan lines. Thus, for example, in a 525 line scan television system a vertical sync pulse will be generated every 262.5 cycles or pulses of the horizontal sync generator. The vertical pulse is thus normally provided in response to every 525th cycle of the basic frequency where the basic frequency is 31.5 kHz. and the horizontal sync frequency is 15.75 kHz.

Briefly, the present novel interlace sync generator, the frequency of the master oscillator, or basic frequency is reduced to the frequency of the horizontal sync pulse, thus making the basic frequency the same as the horizontal frequency. This eliminates a pulse (from the master oscillator) occurring between each of the horizontal pulse.

In order to provide a vertical pulse every 262.5 cycles of the basic pulse the present invention employs a novel technique of counting 262 cycles of the basic frequency and the following 263 cycle of the basic frequency and thereafter repeating the cyclic count, such counts being made on a continuous basis of consecutive cycles, and providing an indication pulse upon occurrence of the 262 cycle count and the 263 cycle count. Application of the indication pulse of the 262 cycle count is delayed one-half a cycle of the basic (horizontal) frequency before the indication pulse is applied as a vertical pulse output. During the one-half cycle delay the next count (263 cycles) is proceeding and thus the indication pulse of the 263 cycle count occurs 262.5 cycles after application of the 262 cycle indication pulse. Thus a vertical pulse is provided every 262.5 cycles of the horizontal frequency.

In the preferred arrangement, described below, the output of the master oscillator is applied to a presettable binary counter which provides a counter output pulse upon counting 262 cycles or pulses of the master oscillator (horizontal pulses) and provides a counter output pulse upon counting the next 263 cycles, being preset after each count and being alternately advanced and retarded according to the number of cycles counted.

With the count operation functioning on a continuous basis the one-half cycle delay of the 262 counter pulse effectively advances the 263 counter pulse one-half cycle with respect to the delayed 262 pulse.

It may readily be seen that the present novel technique may include an adjustable pulse delay circuit so as to adjustably shift the timing of the vertical pulses within the limits of the cyclic differential between consecutive output pulses by the counter.

It should be kept in mind that although the example herein used to describe the present invention particularly relates to a 525 line scan television system, the techniques and principles disclosed herein may be applied to any odd-line scan television system.

It is therefore an object of the present invention to provide a sync generator with adjustable interlace in which the basic operating frequency is the frequency of the horizontal pulse.

Another object is to provide an adjustable interlace sync generator in which a binary counter effectively divides an input frequency by a figure which includes one-half a cycle.

Another object is to provide an adjustable interlace sync generator in which the basic frequency is divided by two different values which are essentially averaged so as to effectively divide the basic frequency by a third value.

These and other objects will become more apparent from reading the following detailed description with reference to the accompanying drawings in which.

Figure 1:
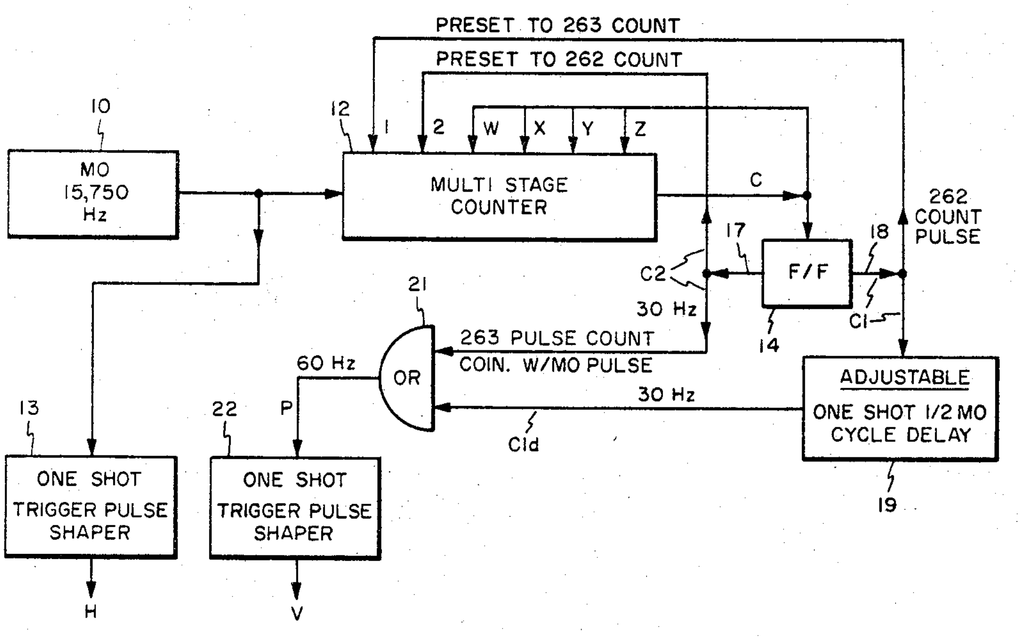
FIG. 1 is a block diagram of the invention.

Referring to FIG. 1 a master oscillator, block 10, has its output applied to a multistage counter 12 and to a one-shot trigger 13. The output frequency of the oscillator is the frequency of the horizontal pulse and for purposes of description is assumed to be 15,750 Hz. The one-shot trigger 13 serves to provide a pulse of the desired width such as the pulse H and therefore may be referred to as a pulse shaper. The multistage counter may be any type multistage counter capable of being preset so that an output pulse C may be provided after a predetermined number or count of pulses received as an input from the output of the master oscillator. In its preferred form the counter is a multistage binary counter.

The output C of the counter 12 is fed back to the counter to serve as part of a presetting pulse. The output C is also applied to a bistable multivibrator, such as flip-flop 14. As will be familiar to those skilled in the art, the flip-flop 14 has two outputs which are alternately provided in response to succeeding pulses. The flip-flop is programmed so as to provide an output pulse C2 on lead 17 in response to the pulse C occurring upon the count of 263 pulses or cycles by the multistage counter 12 and provides an output pulse C1 on lead 18 in response to the pulse C occurring upon the subsequent count of 262 by the multistage counter 12.

The alternately occurring pulses C1 and C2 of the flip-flop 14 are individually combined with the pulses C so that the pulses C and the pulse C2, on lead 17, are fed back to the multistage counter to preset the counter 12 to provide a pulse C in response to a 262 pulse count. The pulses C and the pulse C1, on lead 18, are fed back to the multistage counter to preset the counter 12 to provide a pulse C in response to a 263 pulse count. Thus the multistage counter is alternately preset to count 262 (after having provided an output pulse in response to a count of 263) and then preset to count 263 (after having provided an output pulse in response to a count of 262).

In other words, the C pulses are fed back to the multistage counter as inputs W, X, Y and Z upon each occurrence of the C pulse. The C pulses are also fed to the flip-flop 14 and in response to successive C pulses the flip-flop provides pulses C2 (on lead 17) and C1 (on lead 18), in alternate succession.

Pulse C1 combines at 1 as an input to the multistage counter with inputs W, X, Y and Z so that the input combination 1WXYZ presets the counter 12 so that a count of 263 will provide a pulse C. Pulse C2 combines at 2 as an input to the multistage counter with the inputs W, X, Y and Z so that the input combination 2WXYZ presets the counter 12 so that a count of 262 will provide a pulse C.

Thus it may be seen that the multistage counter is preset alternately to one predetermined count and then to another predetermined count upon alternate output pulses of the counter itself.

It will also be obvious that the pulses C occur at the rate just off 60 times a second (60 Hz.) while the pulses C1 and C2 each occur at the rate just off 30 times a second (30 Hz.), with a differential of one cycle of the master frequency for the pulses C1 and C2.

Figure 2:
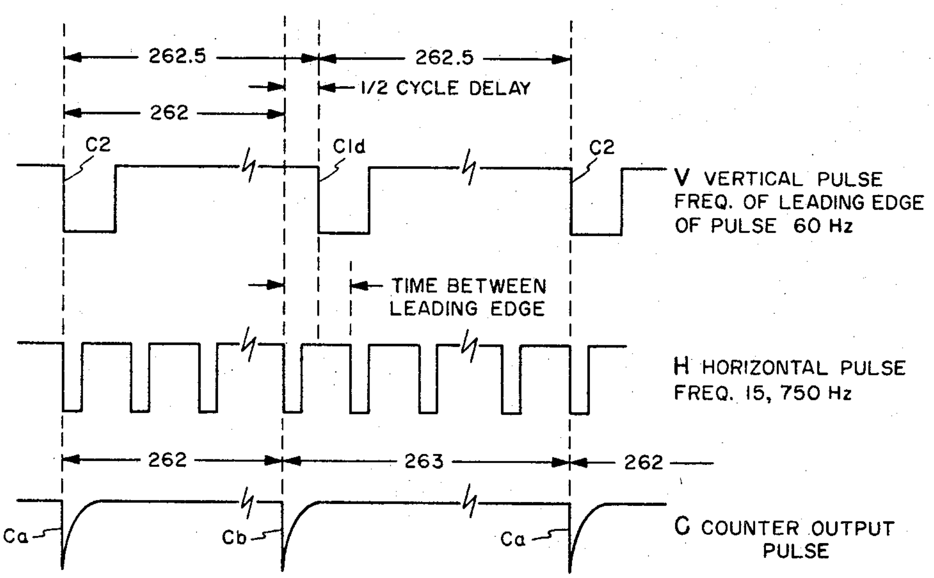
FIG. 2 is a series of related wave forms useful in understanding the invention.

However, observing FIG. 2, it will further be observed that the sequence of occurrence of adjacent pulses C (C*a* and C*b* in FIG. 2) is staggered with respect to each other, that is, one pulse C*b* occurs in response to 262 cycles of the master oscillator output and the next pulse C*a* occurring in response to 263 cycles of the master oscillator output.

In order to average the frequency of output pulses at the final output level, the pulse C1 (in response to a 262 count) is applied to a delay circuit 19. The delay circuit 19 is a preferably a one-shot trigger circuit which includes means for adjusting the delay between the input of pulse C1 and the output of the pulse C1*d*. In an ideal circuit arrangement the delay circuit 19 provides a delay equal to one-half a cycle of the master oscillator frequency output, however, it is anticipated that the delay circuit is adjustable as far as time delay is concerned.

It should be noted that the pulse C1 is applied to the multistage counter as part of the preset pulse and also to the delay circuit. It will then be seen that while the delay of the pulse C1 occurs, the multistage counter is counting toward output of its next pulse so that this dual input arrangement functionally provides for increasing the time interval measured from pulse C2 to occurrence of pulse C1, as delayed (C1*d*) to 262.5 cycles of the master oscillator and for decreasing the time interval measured from pulse C1*d* to occurrence of pulse C2 to 262.5 cycles of the master oscillator. This is seen clearly in FIG. 2.

Each of the pulses C2 and C1*d* are applied to an OR gate 21 which provides an output in response to each input respectively. Thus, the output P of the OR gate 21 is an output in the form of a plurality of pulses, substantially duplicating the input pulses C2 and C1*d*, with respect to time of occurrence, so that the pulses P are separated by 262.5 cycles of the output of the master oscillator. Essentially the pulses P occur at a rate of 60 Hz.

The pulses P are applied to a one-shot trigger, pulse shaper, represented by block 22 which provides a pulse output V at a rate of 60 Hz.

Although in its preferred form, the counter 12 is a digital counter, it is anticipated that other types of counters may be used, which may perform the same function as described, i.e., be presettable and provide a pulse after a predetermined number of cycles or pulse outputs of a master oscillator.

In addition the one-shot triggers, 13 and 22, may take any of several forms. It is preferred that the one-shot triggers 13 and 22 each have wave shaping functions so that the pulses provided at H and V may be of the desired phase and shape. Further, the flip-flop 14 and the OR gate 21 may each take any of the conventional forms.

The one-shot ½ MO (master oscillator) cycle delay is adjustable with respect to the amount of delay time. This provides for adjustment of the interlace of the pulses V.

Referring in more detail to FIG. 2, the various pulses V, H and C and the time relation between them may be seen. The various pulse widths are not necessarily drawn to scale, however, the discussion relating to these pulses is referenced to the leading edge of the respective pulse.

With reference to the pulses H, this series of pulses represents the output of the one-shot trigger, 13 at H. However, the leading edge, or negative-going edge, of each pulse H is coincident in time with a corresponding position of the output pulse of the master oscillator. Thus, the pulses H are occurring at the frequency of the master oscillator, or 15,750 Hz for example.

Selecting the leading edge of the pulse C2, it will be seen that the pulse C2 occurs in coincidence with the leading edge of one of the pulses H and with one of the pulses C, in this case the negative spike pulse C*a*. Counting the number of pulses H, it will be seen that a counter output pulse C*b* occurs in coincidence with the 262nd pulse H. The pulse C*b*, which corresponds to the pulse C1 on lead 18, is delayed for a time interval substantially equal to one-half the cyclic time of the pulses H. Thus, the pulse C1*d* (pulse C1 delayed) occurs at a time interval equal to 262.5 cycles at the frequency of the pulses H, timed from occurrence of the previous pulse C2.

Since the master oscillator is continuing its output, and the counter is simultaneously preset to count 263 cycles, the next occurring counter pulse (C*a*), will occur in coincidence with a full count of 263 H pulses. However, when measured in time the pulse C2 after C1*d* resulting from the counter pulse C*a* occurs 262.5 cycles of the master frequency timed from occurrence of the previous pulse C1*d*.

As previously stated the pulses C1*d* and C2 occur in alternate succession, each at a rate of 30 Hz. Thus the pulses V occur at a ratee of 60 Hz. since the pulses V are represented to be the shaped pulse output of the one-shot trigger pulse shaper 22 resulting from the input pulses P, which correspond to the individually occurring pulses C1*d* and C2.

It has been shown and described how a television sync generator with adjustable interlace for a 525 line television system with a horizontal pulse frequency of 15,750 Hz. and a vertical pulse frequency of 60 Hz. may be provided. Obviously a television sync generator with adjustable interlace may be provided for any odd number line scan system by applying the principles disclosed herein.

The present invention employs a novel combination of components which are readily available or are well known to those skilled in the art. Although specific components have been described as preferred in the present system obviously substitutions and alterations may be made as will be well known to those skilled in the art, without departing from the spirit of the invention as defined by the appended claims.

What is claimed is:

1. In a television sync generator, for an odd-line television system, providing horizontal and vertical sync pulses for an interlaced scan, a master oscillator having an output frequency which is equal to the frequency of the horizontal sync pulses, presettable counting means for providing a first output pulse in response to a predetermined number of input pulses from the master oscillator, means for applying the output of said master oscillator to said counting means for sequentially advancing said counting means in response to each cycle of said output frequency, a bistable multivibrator for providing a first bistable output pulse and a second bistable output pulse in alternate succession in response to successive first output pulses, said first bistable output pulse being provided in response to a first output pulse occurring in response to a predetermined count provided by said counting means, said second bistable output pulse being provided in response to a first output pulse occurring in response to said predetermined count plus one provided by said counting means, means responsive to said first output pulse and said first bistable output pulse for presetting said counting means for providing the next occurring first output pulse in response to counting said predetermined number plus one, of the cycles of the master oscillator, means responsive to said first output pulse and said second bistable output pulse for presetting said counting means for providing the next first output pulse in response to said predetermined number of the cycles of the master oscillator, an OR gate for passing said first bistable output pulse and said second bistable output pulse when received, and means disposed between said OR gate and said multivibrator for delaying application of said first bistable output pulse to said OR gate for a time substantially equal to one-half a cycle of said master oscillator.

2. In a television sync generator as in claim 1 and further including, trigger means responsive to the output frequency of said master oscillator for generating the desired shape horizontal pulses, and second trigger means responsive to the output of said OR gate for generating the desired shape vertical pulses.

3. In a television sync generator as in claim 1 and in which said means for delaying application of said first bistable output pulse is adjustable in time delay.

4. In a sync generator for an odd-line television system providing horizontal and vertical sync pulses for an interlaced scan, a master oscillator having an output frequency which is equal to the frequency of the horizontal sync pulses, means for providing an output pulse in response to at least a predetermined number of cycles of the master oscillator, the last named means being presettable, means for alternately presetting said last named means for providing said output pulse in response to a predetermined number of cycles of said master oscillator and for providing the next output pulse in response to said predetermined number of cycles of said master oscillator plus one cycle of said master oscillator, a bistable multivibrator for providing a first bistable output pulse when said output pulse is in response to said predetermined number of cycles and a second bistable output pulse when said output pulse is in response to said predetermined number of cycles plus one cycle, an OR gate for receiving and passing said first bistable output pulse and said second bistable output pulse when received, and means disposed between said OR gate and said multivibrator for delaying application of said first bistable output pulse to said OR gate for a time substantially equal to one-half a cycle of said master oscillator.

5. In a sync generator as in claim 4 and in which said means for providing said output pulse is a digital counter, and said means for alternately presetting said counter is a combination of said output pulse and said first bistable output pulse and a combination of said output pulse and said second bistable output pulse.

6. In a sync generator as in claim 4 and in which said means for delaying application of said first bistable output pulse to said OR gate is adjustable in time over the range of one cycle of the master oscillator.

7. In a sync generator as in claim 4 and in which said means for providing said output pulse is a ring counter which advances at the same frequency, and in step with the master oscillator.

8. In a sync generator for an odd-line television system for providing horizontal and vertical pulses for an interlaced scan, a master oscillator having an output frequency which is equal to the frequency of the horizontal sync pulses, means sequentially advanced in step with said master oscillator for providing an output in response to a predetermined number of input pulses from said master oscillator and resettable for providing another output in response to said predetermined number of input pulses from said master oscillator plus one pulse, a bistable multivibrator for providing a first pulse when the output of said last mentioned means is in response to said predetermined number of input pulses and for providing a second pulse when the output of said last mentioned means is in response to said predetermined number of input pulses, plus one, means for receiving said first pulse and for delaying said first pulse in time equal to substantially one-half a time cycle of said master oscillator, and output means for producing output pulses from said second pulse and the delayed first pulse which output pulses are separated by a time substantially equal to the time interval of said predetermined number of input pulses of said master oscillator plus one-half a pulse time of said master oscillator.

9. In a sync generator as in claim 8 and in which said output means is a one-shot trigger pulse shaper and said generator further includes, a second one-shot trigger pulse shaper for shaping the output pulses of said master oscillator for forming said horizontal sync pulses.

References Cited

UNITED STATES PATENTS 2,705,285 3/1955 Holland et al. ------ 178—69.5

ROBERT L. GRIFFIN, *Primary Examiner.*

R. L. RICHARDSON, *Assistant Examiner.*